(12) United States Patent
Sherif et al.

(10) Patent No.: US 11,046,591 B1
(45) Date of Patent: Jun. 29, 2021

(54) LOW ENERGY DESALINATION SYSTEM INCLUDING VENTURI DEVICE

(71) Applicant: UNITED ARAB EMIRATES UNIVERSITY, Al Ain (AE)

(72) Inventors: Mohsen Sherif, Al Ain (AE); Fadi Alnaimat, Al Ain (AE); Bobby Mathew, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/151,183

(22) Filed: Jan. 17, 2021

(51) Int. Cl.
| | | |
|---|---|---|
| C02F 1/06 | (2006.01) | |
| B01L 3/06 | (2006.01) | |
| C02F 1/04 | (2006.01) | |
| B01D 3/06 | (2006.01) | |
| C02F 103/08 | (2006.01) | |

(52) U.S. Cl.
CPC .............. *C02F 1/06* (2013.01); *B01L 3/06* (2013.01); *C02F 1/043* (2013.01); *C02F 2103/08* (2013.01); *C02F 2301/063* (2013.01); *C02F 2301/066* (2013.01)

(58) Field of Classification Search
CPC ...... C02F 1/043; C02F 1/06; C02F 2301/063; C02F 2301/066; C02F 2301/08; B01D 3/06
See application file for complete search history.

(56) References Cited

U.S. PATENT DOCUMENTS

| | | |
|---|---|---|
| 7,527,711 B2 | 5/2009 | Ciudaj |
| 9,458,033 B2 | 10/2016 | Rapoport |
| 2018/0002202 A1 | 1/2018 | Elshafei |

FOREIGN PATENT DOCUMENTS

| | | |
|---|---|---|
| CN | 106629947 A | 5/2017 |
| CN | 110203988 A | 9/2019 |

OTHER PUBLICATIONS

Proetto, Brandon. "Single-Stage, Venturi-Driven Desalination System" (2018). Master of Science (MS), Thesis, Mechanical & Aerospace Engineering, Old Dominion University, DOI: 10.25777/tzck-4w96 https://digitalcommons.odu.edu/mae_etds/306.*
Proetto, Single-Stage, Venturi-Driven Desalination System, 2018, Master of Science (MS), Thesis, Mechanical & Aerospace Engineering, Old Dominion University.

* cited by examiner

*Primary Examiner* — Brian A McCaig
(74) *Attorney, Agent, or Firm* — Nath, Goldberg & Meyer; Richard C. Litman

(57) ABSTRACT

A low energy desalination system with a venturi device includes a saline water feed, a pump, and a venturi device. The pump provides saline water to the nozzle of the venturi device. The fluid flowing through the nozzle speeds up at the throat or constricted region of the device. This results in a reduction in pressure at the throat of the device. The reduced pressure at the throat of the device makes the fluid susceptible to evaporation which causes a certain amount of water to evaporate from the saline water. Freshwater vapor from the fluid flows through a freshwater vapor outlet at the throat of the venturi device to a freshwater tank and the concentrated brine remaining in the venturi device flows toward the diffuser of the venturi device and then to a brine tank.

10 Claims, 19 Drawing Sheets

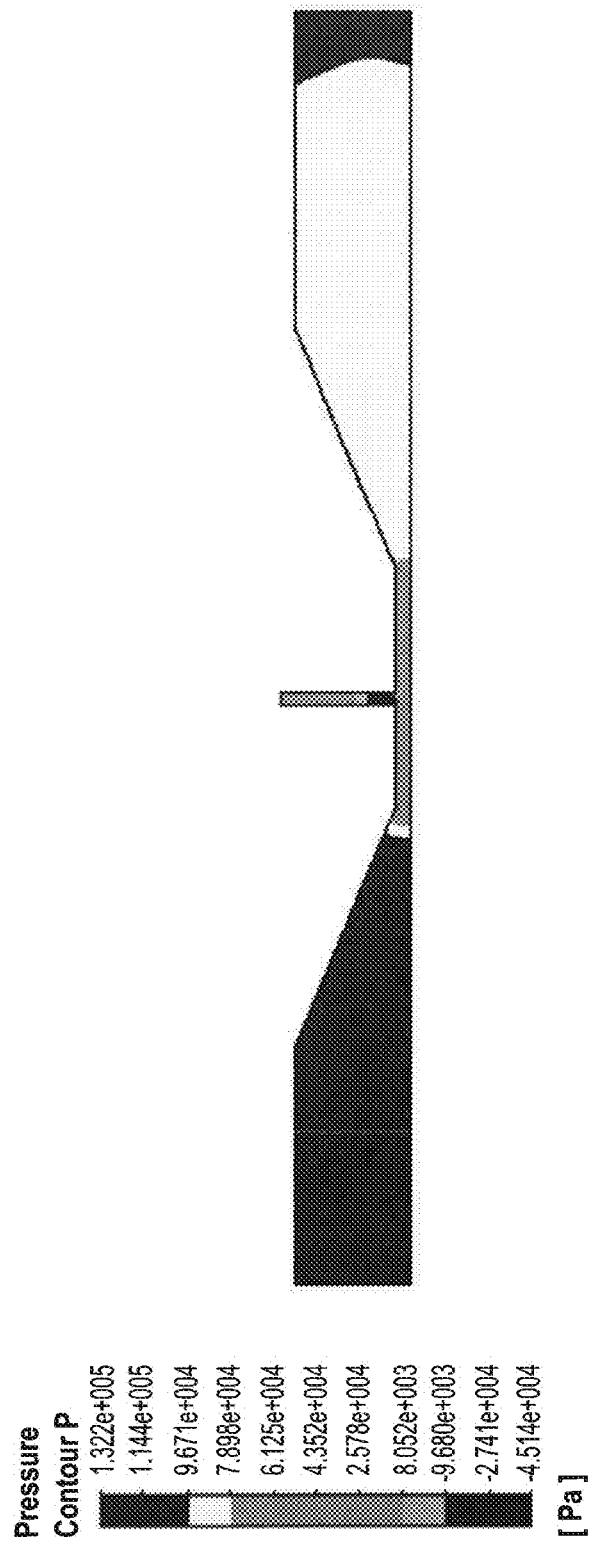

LOW ENERGY DESALINATION SYSTEM INCLUDING VENTURI DEVICE

BACKGROUND

1. Field

The disclosure of the present patent application relates to desalination, and particularly to a low energy desalination system including a venturi device.

2. Description of the Related Art

The market for desalination is vast, including many countries, cities, and small communities worldwide. Freshwater scarcity continues to be one of the most prominent issues facing civilization at the global level. Water requirements are especially high in arid and semi-arid regions where renewable and traditional water resources and rainfall are scarce. The lack of freshwater in such areas contributes to poor health, low nutrition, and poverty, as well as hindering efforts to improve living standards and achieve sustainable development. One of the most effective methods to alleviate water shortages is through seawater desalination.

Desalination technologies can be classified based on their separation mechanism into thermal desalination and membrane desalination. The most frequently applied desalination techniques are reverse osmosis (RO), multi-stage flash (MSF), multiple-effect distillation (MED), electro-dialysis (ED), and vapor compression (VP). Thermal desalination is based on the principle of heating saline water using external means to a temperature near saturation temperature to convert liquid water to vapor by evaporation, and then condensing the fresh vapor in another compartment without salt. The remaining heated saline water becomes more salty and then discarded. Membrane desalination utilizes a membrane to separate the salt from the water. In general, thermal desalination is more energy intensive than membrane desalination. Thermal desalination, however, can process water with higher salt concentrations than membrane desalination, while also producing better water quality. Among all of these desalination techniques, RO and MSF are the most commonly used.

Rapid globalization and fast increase in human population, especially in large cities, have increased the requirements to improve desalination processes and minimize its energy requirements and adverse impacts. Modern desalination processes have become more reliable and have expanded significantly during the last few decades. However, all of the above-described desalination processes require significant amounts of energy to produce freshwater. The need for desalination processes that are compact and scalable, with lower initial and operating costs, high efficiency and low energy consumption has prompted the development of different types of desalination processes.

Thus, a low energy desalination system including a venturi device solving the afore-mentioned problems is proposed.

3. SUMMARY

A low energy desalination system including a venturi device provides fresh water using a relatively simple configuration. The system includes a saline water feed, a pump, and a venturi device. The pump provides relatively low-pressure saline water to the nozzle of the venturi device. The fluid flowing through the nozzle speeds up at the throat or constricted region of the device. This results in a reduction of the pressure at the throat (or constriction) of the device. Noting that the liquid at a lower pressure would evaporate at a lower temperature, the reduced pressure at the throat of the device makes the fluid susceptible to evaporation. As such, a certain amount of the saline water evaporates, leaving the salt behind. Freshwater vapor from the fluid flows through a freshwater vapor outlet at the throat of the venturi device to a freshwater tank and the concentrated brine remaining in the venturi device flows toward the diffuser of the venturi device and then to a brine tank. The system is configured to desalinate water at ambient or slightly above ambient temperatures and pressures, which reduces energy requirements. The system is scalable and suitable for small-scale decentralized rural systems, as well as large-scale centralized urban systems.

The proposed desalination system may be used in desert areas where freshwater supplies are not available and saline/brackish groundwater resources are available. Many industrial and business sectors can benefit from the low energy desalination system, such as, beverage processing industries; food processing industries; power generation industries; steel and manufacturing processing industries; and food and agriculture industries. The desalination system would allow such industries to fully operate in areas where freshwater resources are limited. The process and system do not require a heating element to achieve evaporation and the only power requirement is for pumping, when only unpressurized saline water is available. Unlike thermal desalination, no other external power is required. The pumping power consumption of the desalination system is dependent on the pressure drop and the flow rate in the desalination process. The desalination system takes advantage of the Venturi effect which applies Bernouilli's principle to a fluid that flows through a tube with a constriction in it, such as the venturi device described herein.

The fabrication of the system is relatively easy and uses low-cost material when compared to other desalination systems. The system is scalable in size and can therefore be scaled depending on the freshwater yield required. In smaller embodiments, the system can be lightweight and compact in size for portability.

These and other features of the present subject matter will become readily apparent upon further review of the following specification.

4. BRIEF DESCRIPTION OF THE DRAWINGS

FIG. 6B shows the pressure distribution along the venturi structured device of the low energy desalination system.

(7B) the pressure along the axial direction of the venturi structured device (v=2 m/s, $P_{out,vap}$=25 kpa).

Figure 8:
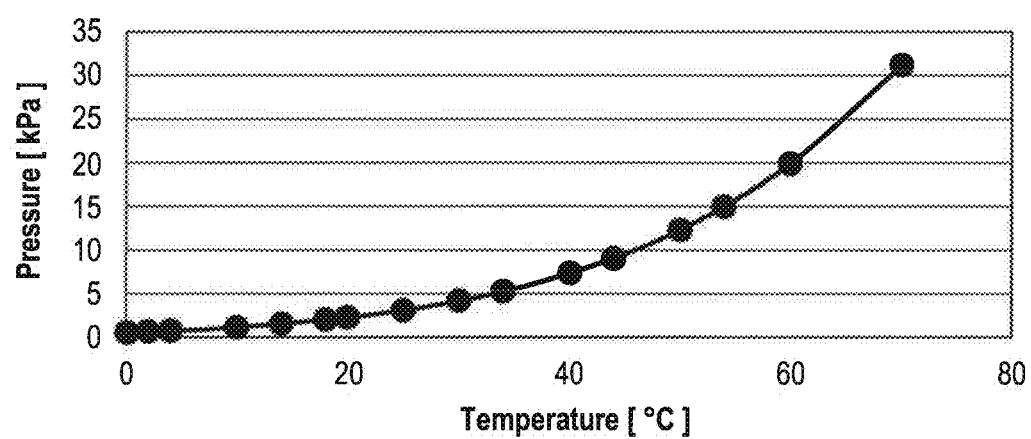

FIG. 8 is a graph showing saturation vapor pressure versus temperature.

Figure 9A:
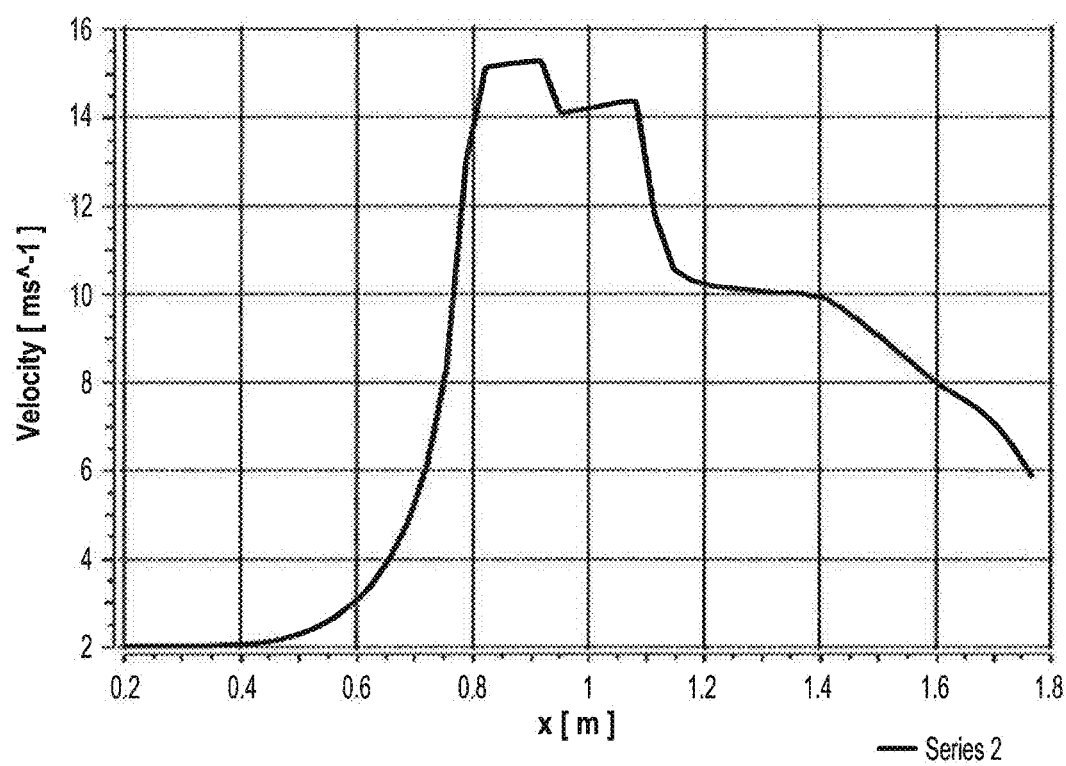
Figure 9B:
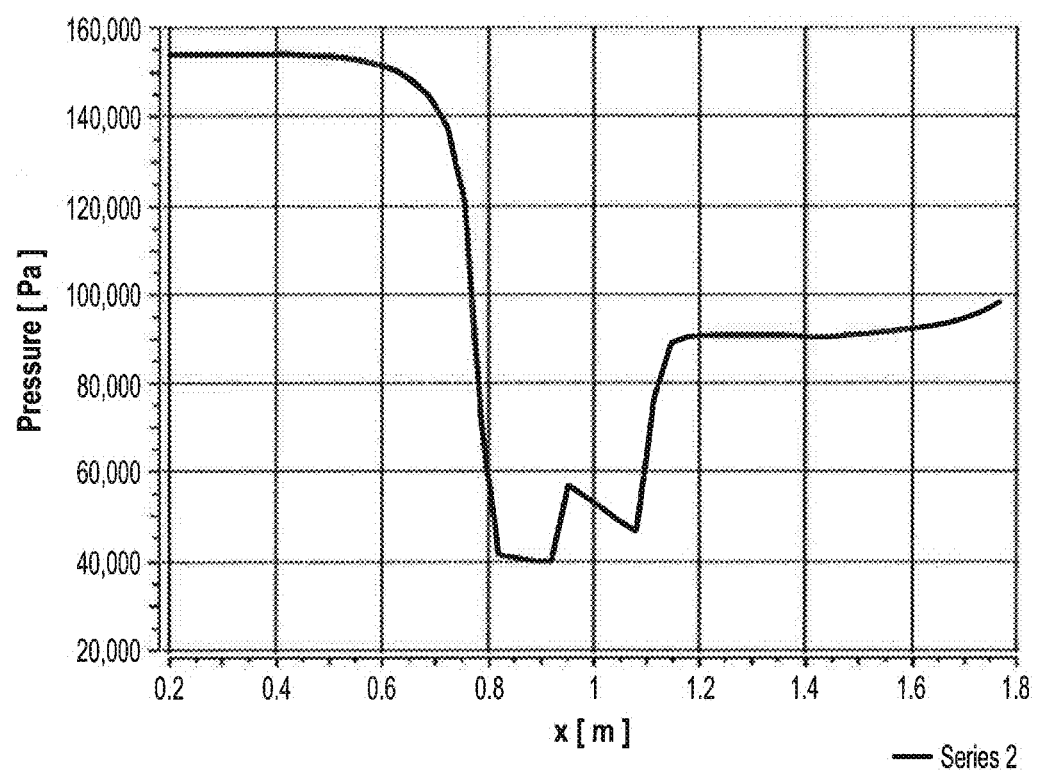

FIGS. 9A-9B depict graphs showing (9A) the velocity along the axial direction of the venturi structured device; (9B) the pressure along the axial direction of the venturi structured device (v=2 m/s, $P_{out,vap}$=50 kpa).

Figure 10A:
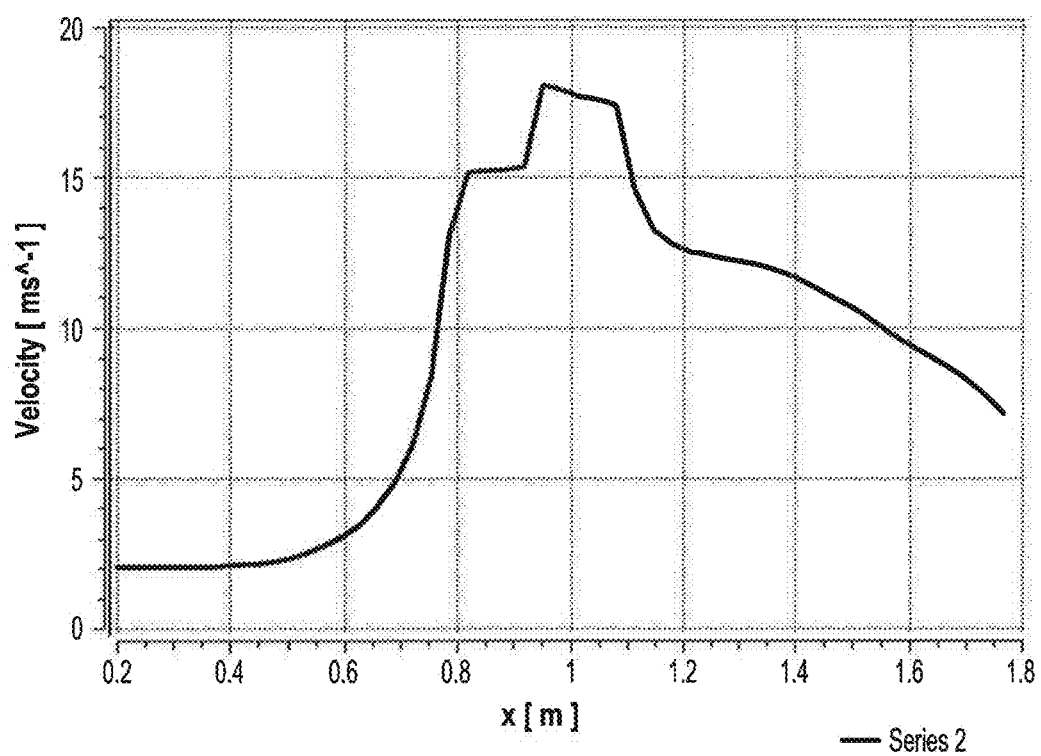
Figure 10B:
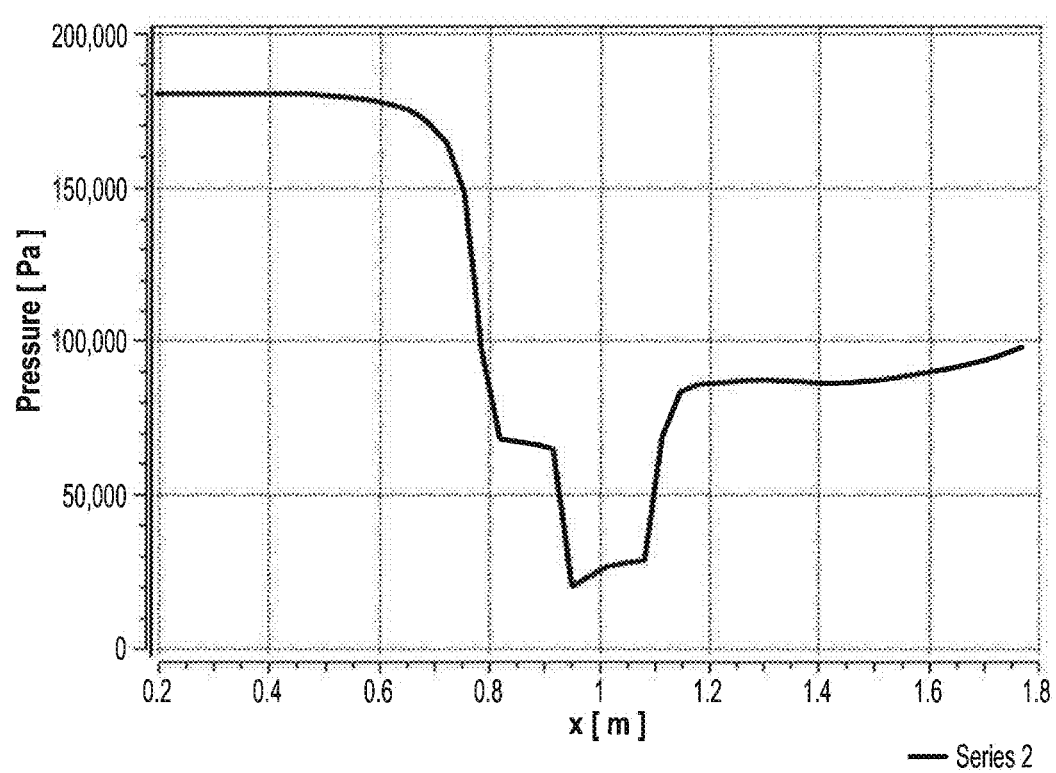

FIGS. 10A-10B depict graphs showing (10A) the velocity along the axial direction of the venturi structured device; (10B) the pressure along the axial direction of the venturi structured device (v=2 m/s, $P_{out,vap}$=75 kpa).

Figure 11A:
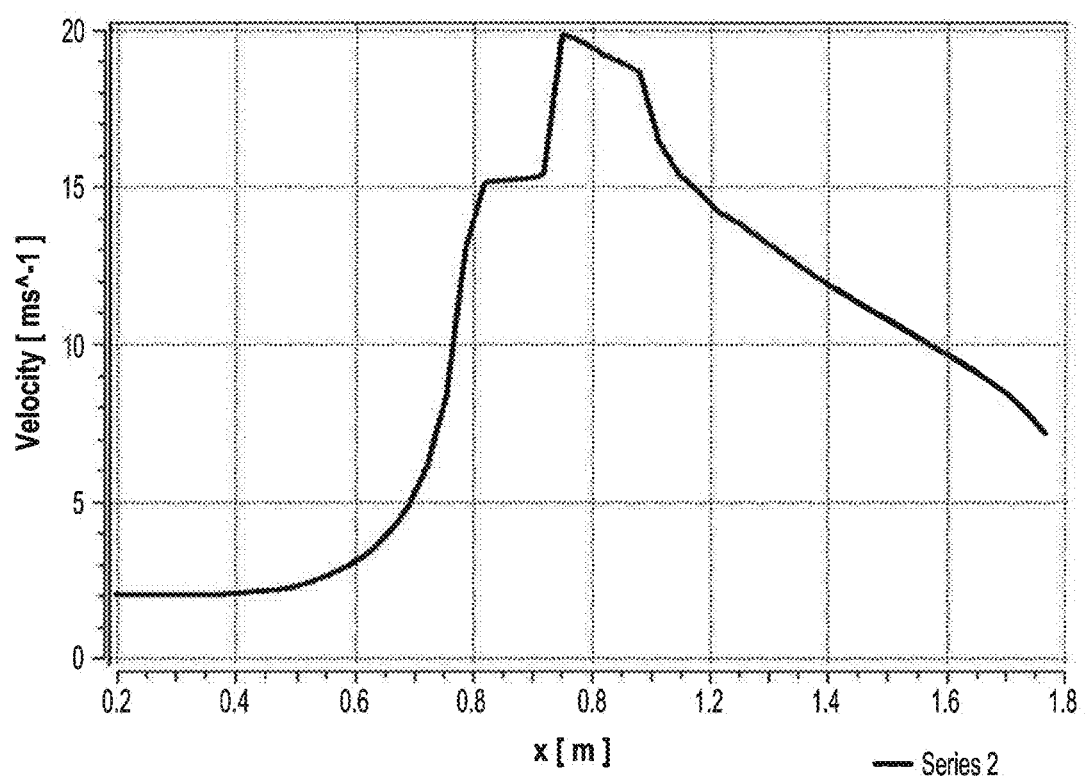
Figure 11B:
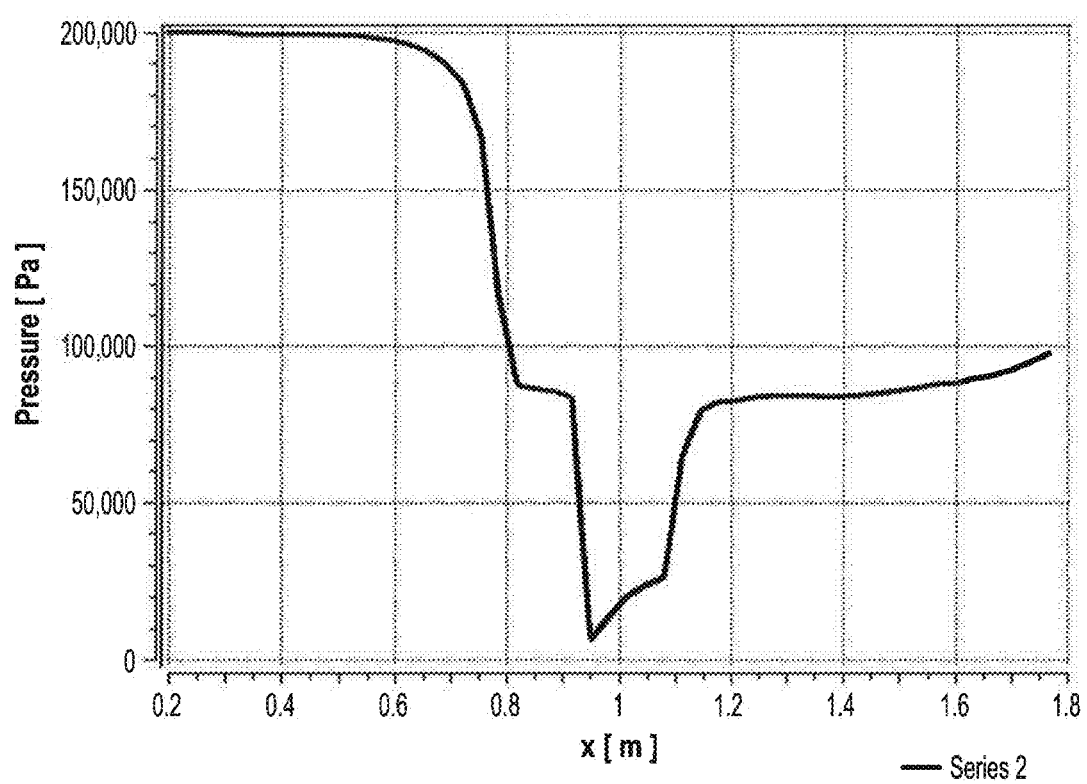

FIG. 11A-11B depict graphs showing (1A) the velocity along the axial direction of the venturi structured device; (11B) the pressure along the axial direction of the venturi structured device (v=2 m/s, $P_{out,vap}$=100 kpa).

Figure 12A:
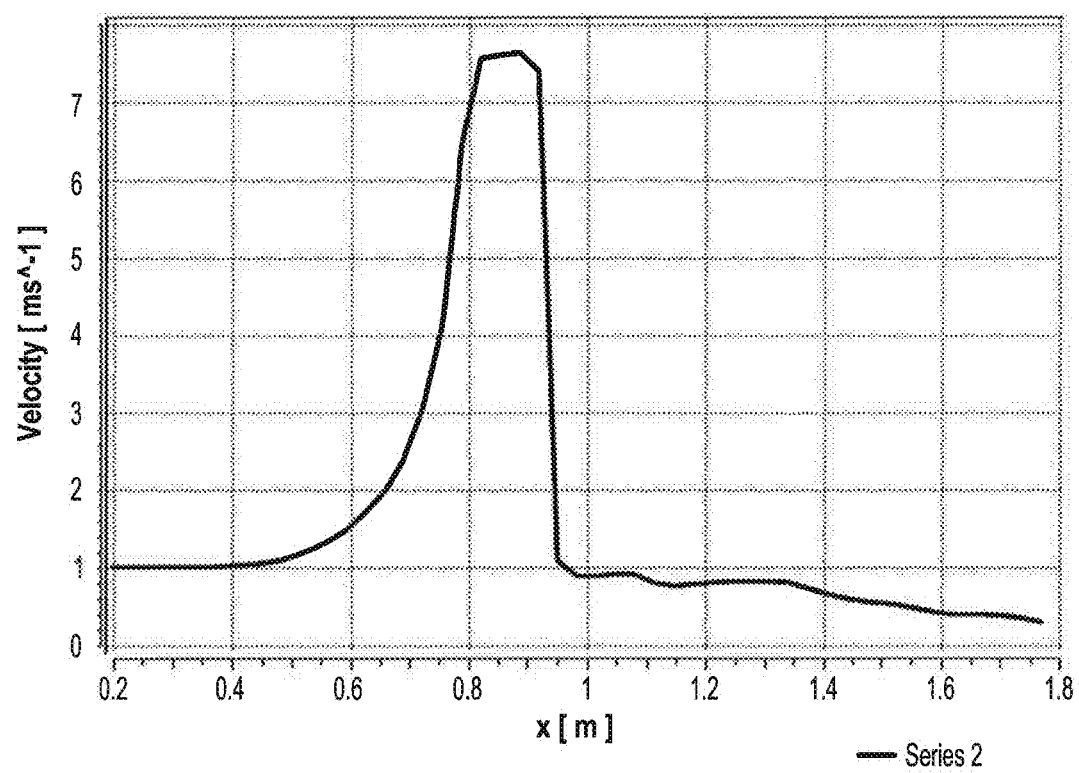
Figure 12B:
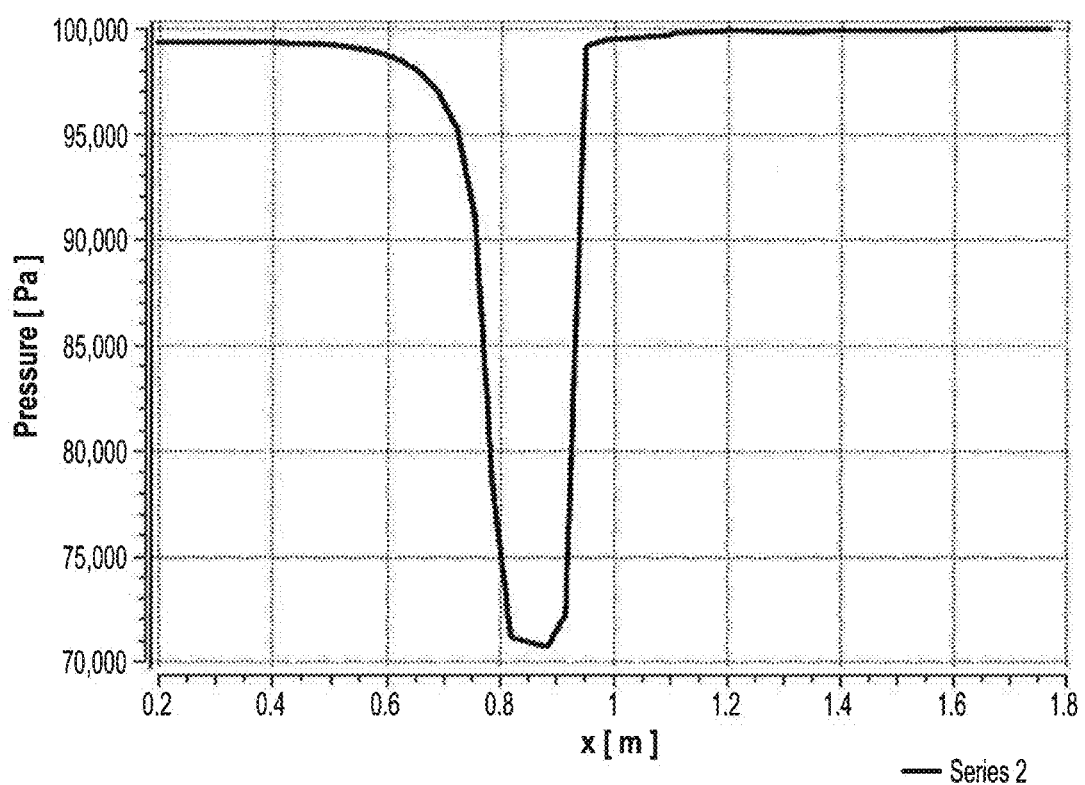

FIGS. 12A-12B depict graphs showing (12A) the velocity along the axial direction of the venturi structured device; (12B) the pressure along the axial direction of the venturi structured device (v=m/s, $P_{out,vap}$=25 kpa).

Figure 13A:
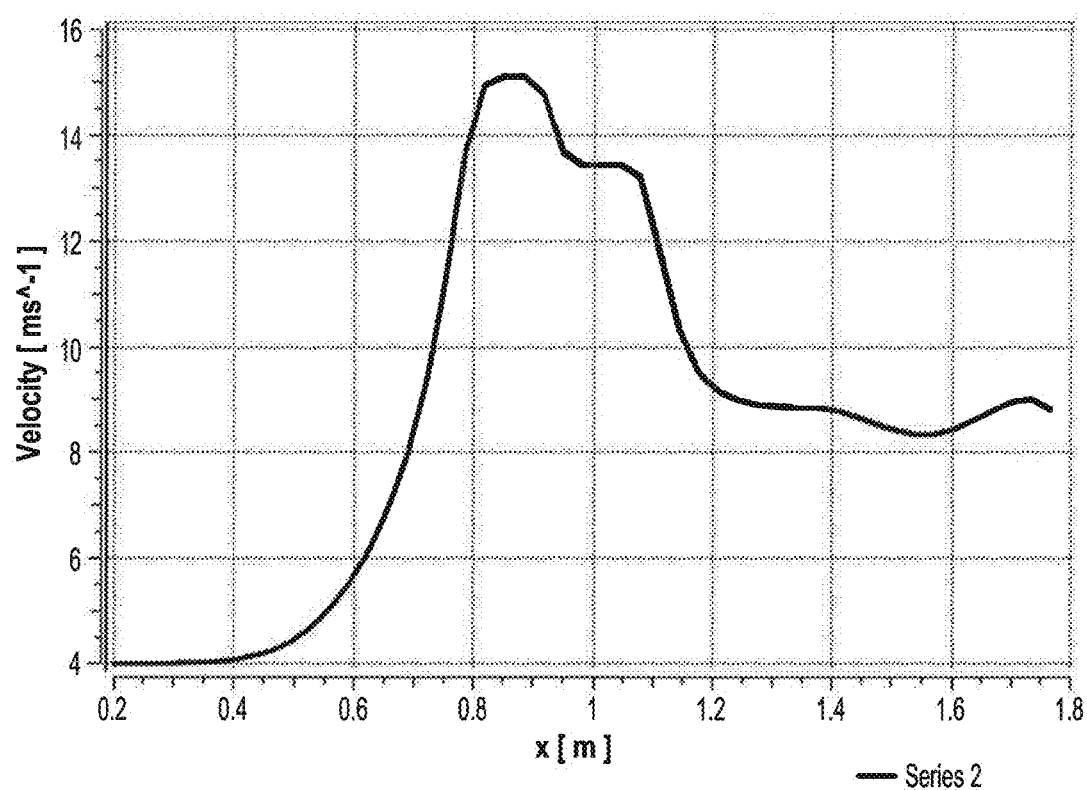
Figure 13B:
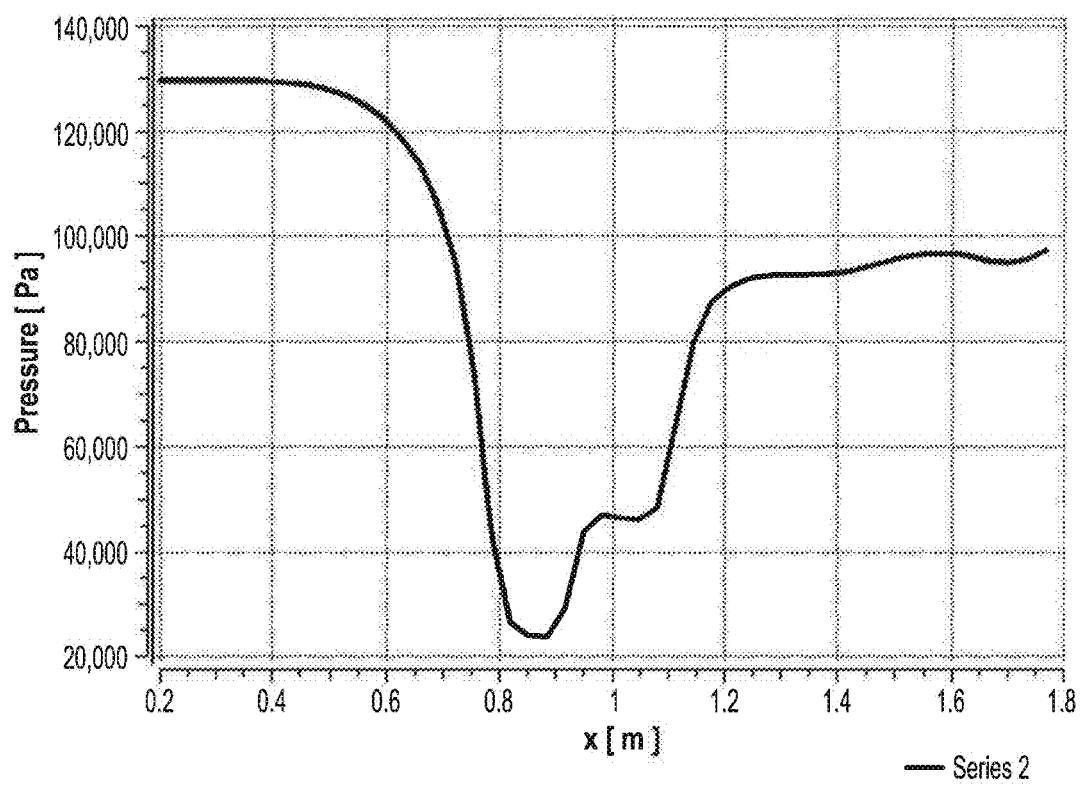

FIGS. 13A-13B depict graphs showing (13A) the velocity along the axial direction of the venturi structured device; (13B) the pressure along the axial direction of the venturi structured device (v=4 m/s, $P_{out,vap}$=50 kpa, Dth=8 cm).

Similar reference characters denote corresponding features consistently throughout the attached drawings.

5. DETAILED DESCRIPTION OF THE PREFERRED EMBODIMENTS

Figure 1:
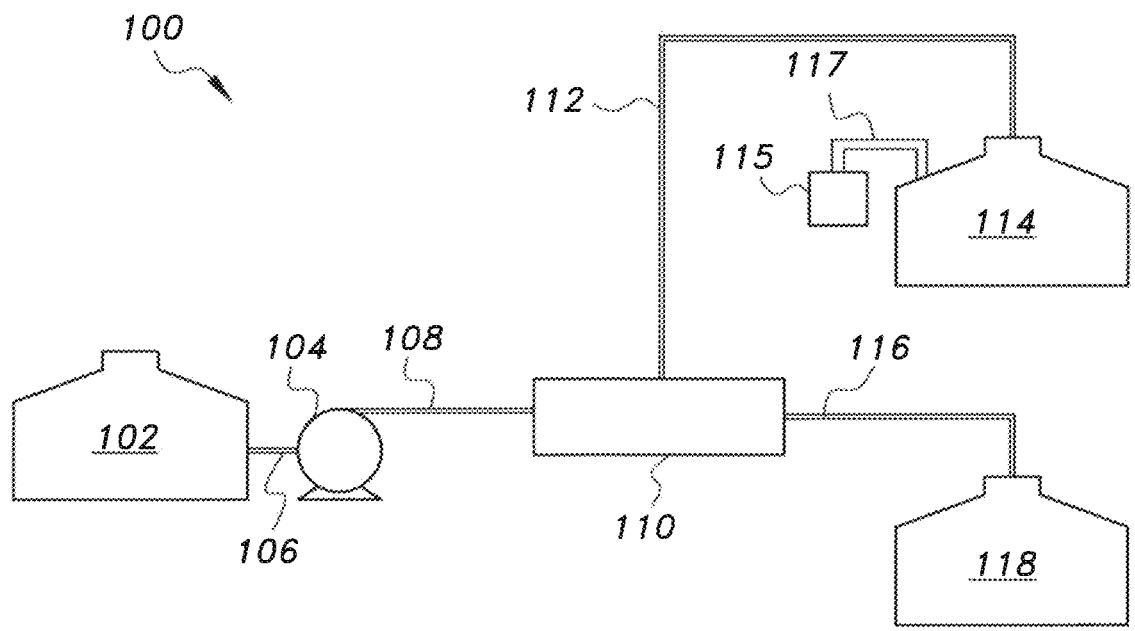
FIG. 1 is a schematic diagram of the low energy desalination system including a venturi device.
Figure 2:
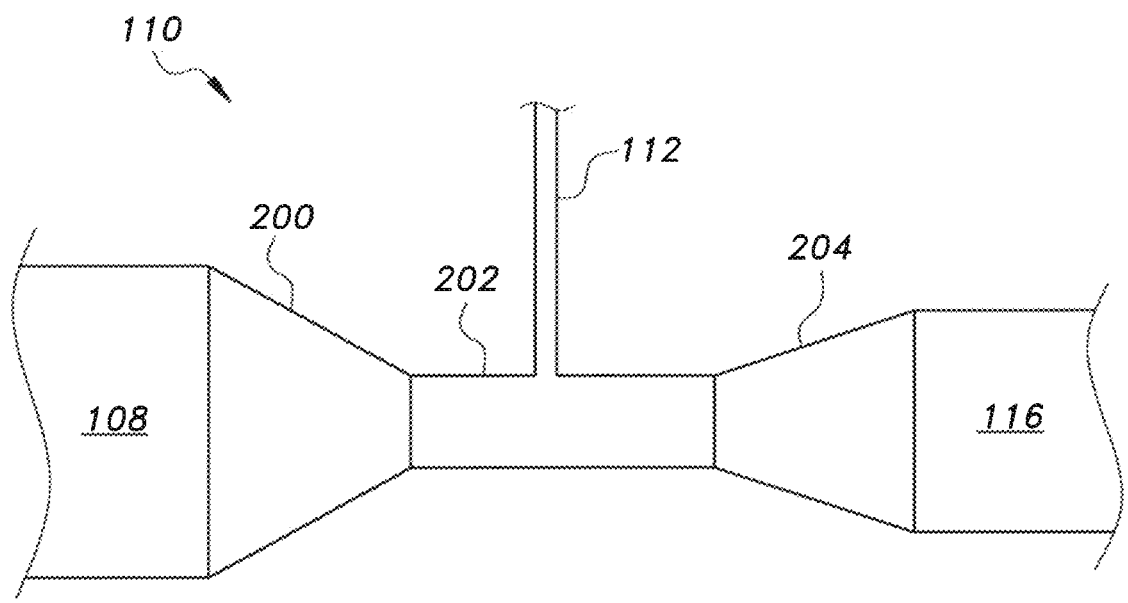
FIG. 2 is an enlarged schematic diagram of the venturi device of the low energy desalination system of FIG. 1.

A low energy desalination system including a venturi device 100 is shown schematically in FIG. 1. The system 100 includes a source of saltwater (saline) which may be a saltwater tank 102 as shown, a saltwater pump 104, a venturi device 110, a freshwater tank 114, and a brine tank 118. It should be understood that the source of saltwater may ultimately be a body of saltwater or other source outside of the system 100.

The venturi device 100 includes a hollow tube 202 with a nozzle 200 at one open end, a diffuser 204 at an opposing open end, and a freshwater vapor pipe 112 connected to a vapor outlet defined through a wall of tube. The saltwater pump 104 receives the saltwater from the saltwater tank 102 via a supply pipe 106 and pumps saltwater to the venturi device 110 via a saltwater pipe 108. Saltwater from the saltwater pipe 108 is introduced to the venturi device 100 through the nozzle 200. The nozzle 200 is generally cone shaped and tapers from a generally circular large end to a generally circular small end. A throat of the device 100 is defined by the inner portion of the tube between the nozzle 200 and freshwater vapor outlet. As the saltwater enters the throat of the venturi device 110, the velocity of the saltwater increases and its pressure decreases, as is known in venturi devices. The decrease in pressure vaporizes some of the water, creating water vapor that can leave the device 100 through vapor outlet and pipe 112. The diffuser 204 reduces the velocity of the resulting concentrated brine and directs the brine into brine pipe 116. Water vapor leaving the venturi device 110, as described below, can be collected in freshwater tank 114. Concentrated brine remaining in the venturi device 110 can be fed into the brine tank 118 as shown, or to a body of saltwater or other facilities outside of the system 100, via the brine pipe 116.

The desalination system takes advantage of the Venturi effect which applies Bernouilli's principle to a fluid that flows through a tube with a constriction in it, such as the venturi device described herein. The fluid flowing through the venturi device 110 speeds up at the throat or constricted region of the device. This results in a reduction in pressure at the throat or constriction of the device. The reduced pressure at the throat or constriction of the device makes the fluid susceptible to evaporation, which causes a certain amount of water to evaporate from the saline water. Fluid flows through the system at low pressure and ambient or slightly above ambient temperature, which eliminates the thermal energy requirement for the desalination process. The system allows for continuous flow, which enables high yields of freshwater over time.

In an embodiment, a source of vacuum, such as a reservoir 115 can be connected to the fresh water tank 114 by a vacuum pipe 117, to maintain a pressure in the fresh water tank 114 below the pressure in the throat of the venturi device 110.

The venturi device is preferably constructed from materials that can resist erosion and corrosion. Such materials include CA15 steel with a Brinell hardness number (BHN) of 410, Aluminum, Bronze, and Titanium.

The particular dimensions of the venturi device 110 (such as inlet/throat and outlet/throat cross sectional area) and other components of the low energy desalination system 100 are based on many parameters and variables such as inlet liquid temperature, inlet liquid salt concentration, inlet and outlet pressures, and flow rate. The operating pressure drops can be adjusted (by controlling the flow rate (pump speed)) to achieve the required pressure for water evaporation. The dimensions of the venturi device 110 influence the desalination yield rate, which affect the water velocity and pressure. The performance of the low energy desalination system using a venturi device 100 can be improved by the use of the low pressure reservoir that can be in or connected to the low pressure fresh water tank 114, which leads to enhanced performance. In an embodiment, the low-pressure reservoir can be a vacuum source.

Figure 3:
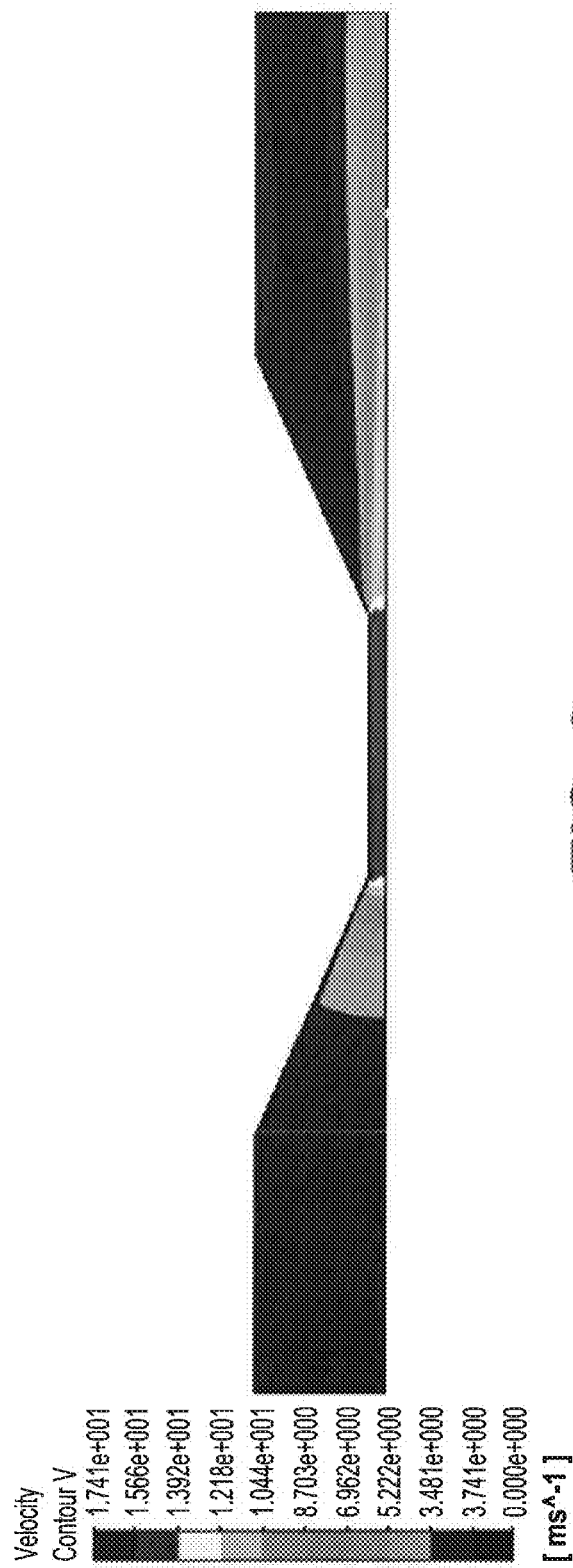
FIG. 3 shows the velocity distribution along the venturi structured device of the low energy desalination system.
Figure 4:
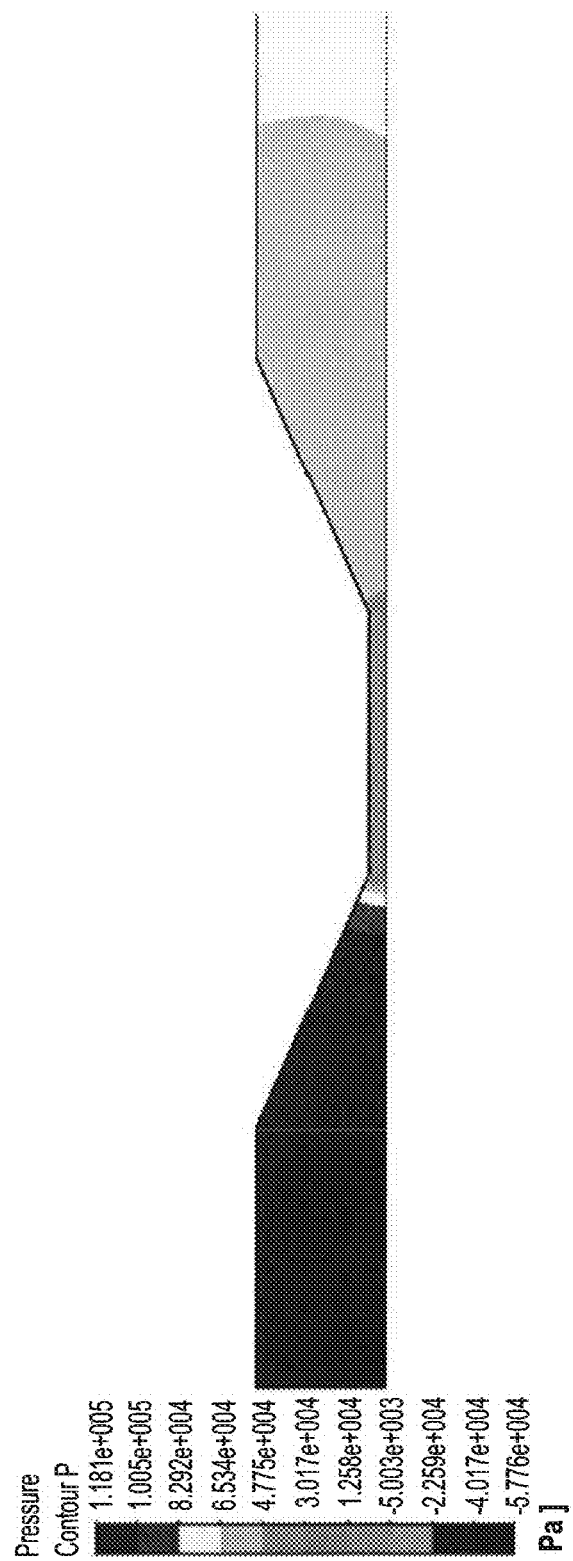
FIG. 4 shows the pressure distribution along the venturi structured device of the low energy desalination system.
Figure 5A:
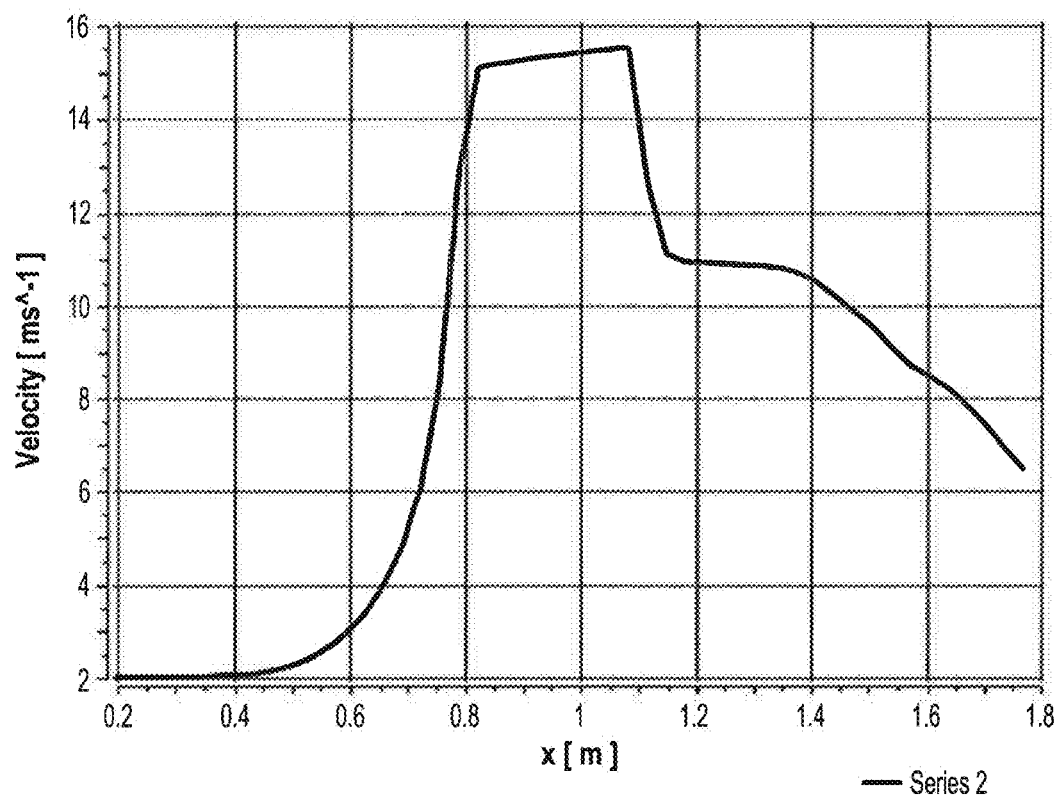
FIGS. 5A-5B depict graphs showing (5A) the velocity along the axial direction of the venturi structured device; (5B) the pressure along the axial direction of the venturi structured device.
Figure 5B:
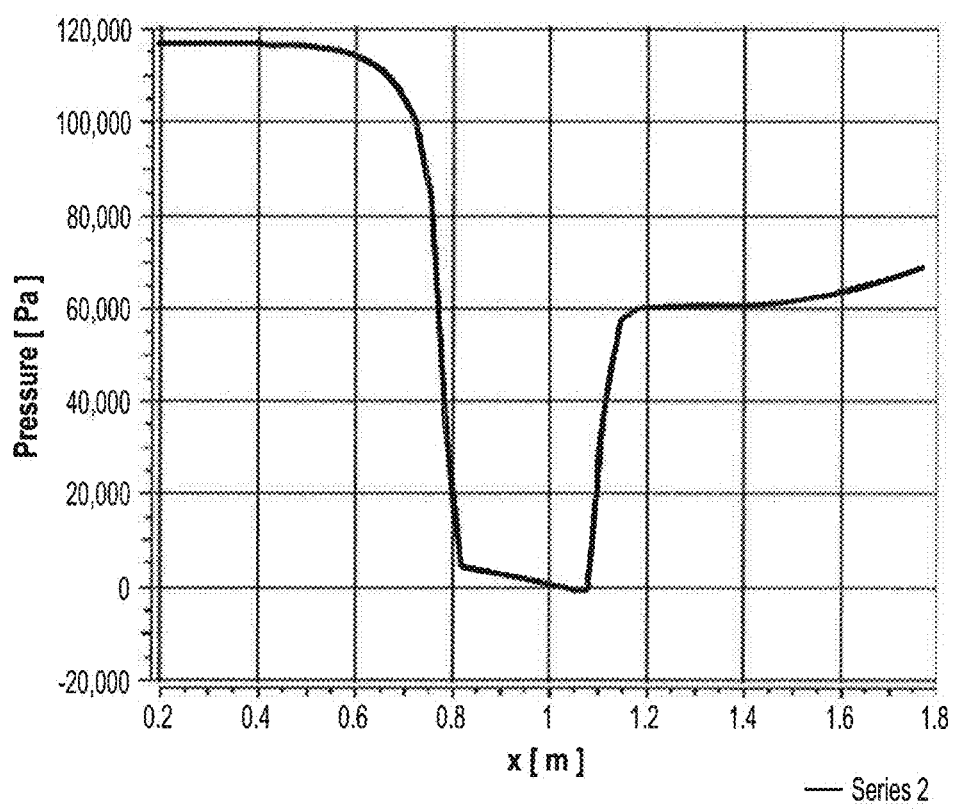

A numerical simulation-based investigation was carried out to confirm the workability of the system described herein. The obtained results confirm the workability of the system. The dimensions of the exemplary current simulated flow domain were $R_{in}$=25 cm; $D_{thorat}$=4 cm; $L_{in}$=50 cm; and $L_{out}$=50 m. Simulation study was carried out using saline water to examine pressure distribution inside the venturi device. FIGS. 3 and 4 show the velocity and pressure distribution, respectively, inside the venturi device. As shown, the velocity increases in the flow direction from the inlet to the decreasing cross-sectional area, the pressure decreases until the flow reaches the throat of the venturi device. The pressure at the throat is reduced to a value below the saturation pressure of the water, which leads to water evaporation at low pressure and temperature. FIGS. 5A and 5B present the velocity and pressure variations along the axial direction of the venturi device. The pressure reduces drastically from the inlet pressure to the throat pressure due to the substantial increase in fluid velocity. The pressure along the channel throat is very low, i.e., near vacuum and, hence, enhances water evaporation significantly. The evaporated water, i.e. vapor, can be removed from the saline water in the throat section. The very low pressure at the throat can be controlled by changing the inlet and throat diameters as well as the flow rate.

As stated previously, as the fluid flows into the converging section, it increases its velocity to maintain a constant flow rate. This leads to very low pressure at the end of the converging nozzle and in the throat section. This pressure is lower than the saturation pressure, thereby allowing the water to evaporate. Water vapor is removed from the throat section and subsequently condensed and collected in the freshwater reservoir as shown in FIG. 1.

Figure 6A:
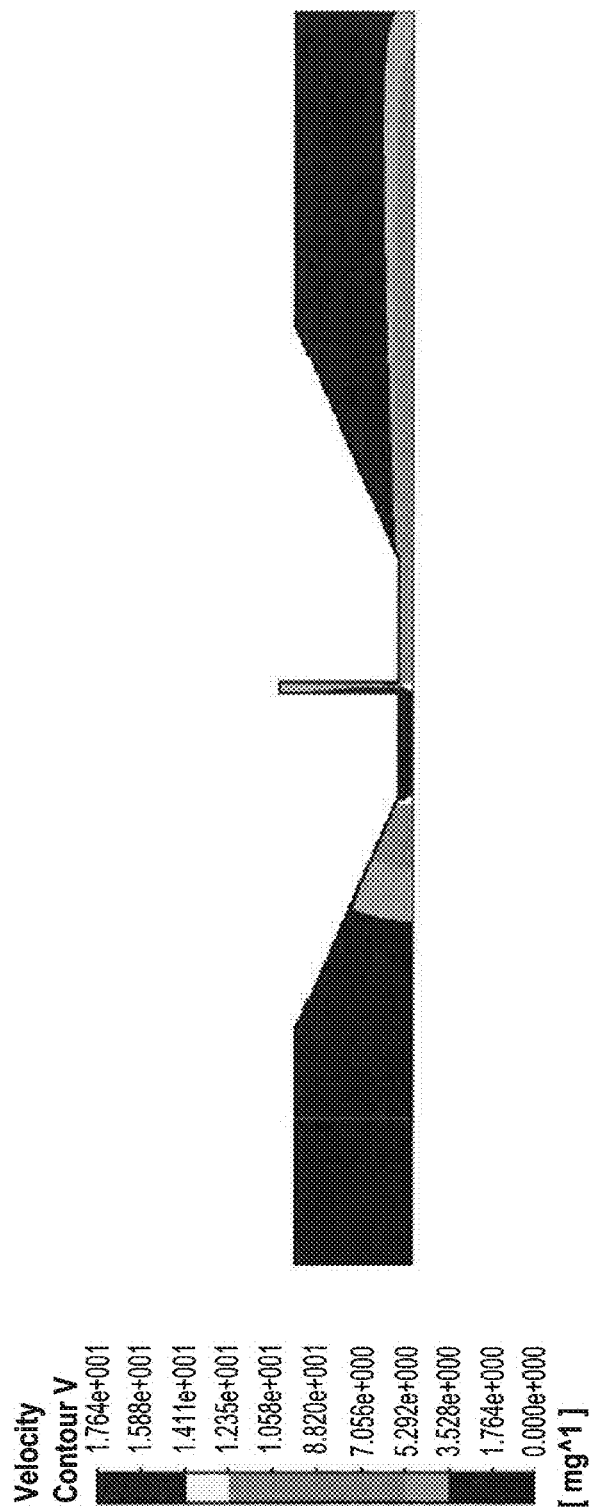
FIG. 6A shows the velocity distribution along the venturi structured device of the low energy desalination system.
Figure 7A:
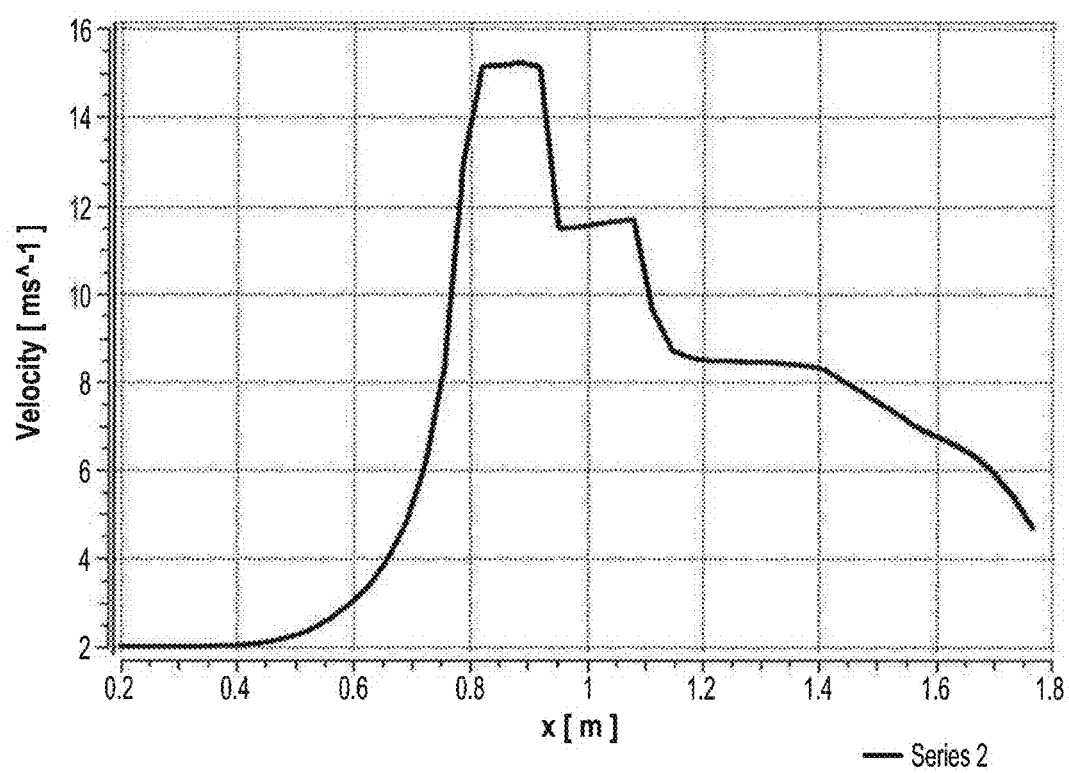
FIGS. 7A-7B depict graphs showing (7A) the velocity along the axial direction of the venturi structured device.
Figure 7B:
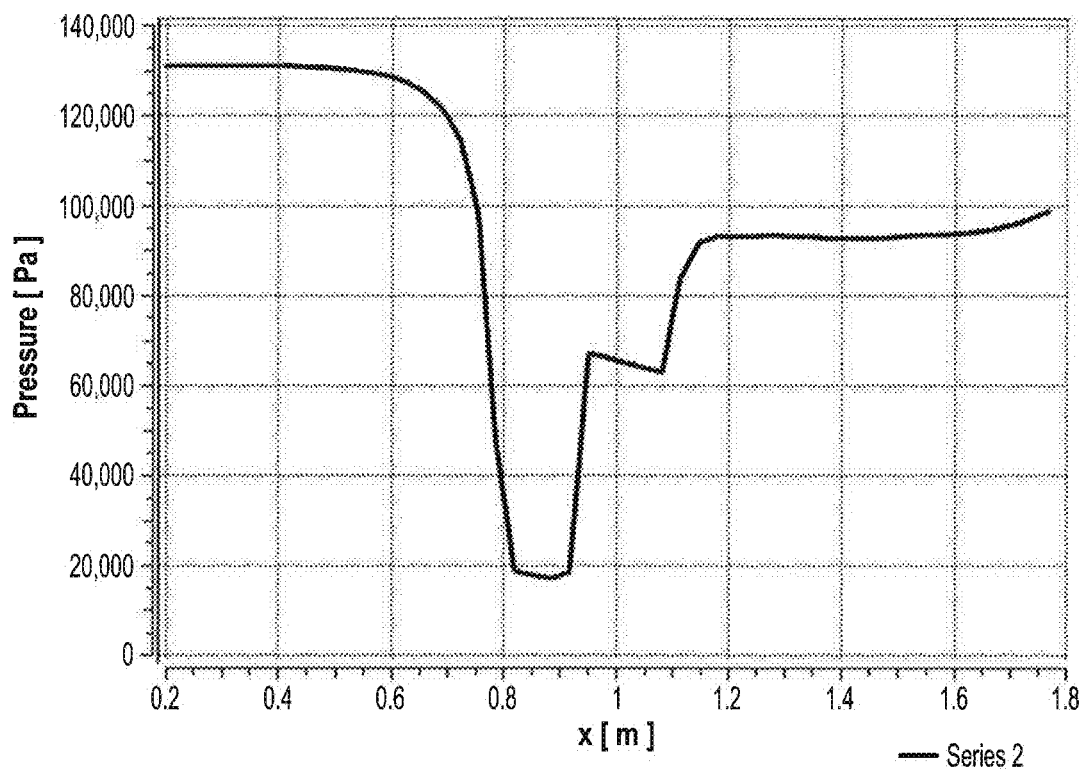

A simulation was carried out with saline water to examine pressure distribution inside an exemplary venturi device according to the present teachings with the water vapor outlet at the center of the throat section section. FIGS. 6A and 6B show the velocity and pressure distribution inside the venturi compartment, respectively. As shown, the velocity increases in the flow direction from the inlet to the decreasing cross-sectional area. The pressure decreases along the flow direction until reaching the throat of venturi structured device. The pressure is reduced to a value lower than the vapor pressure of the water, which leads to water evaporation at low pressure and temperature. FIGS. 7A, 9A, 10A, 11A, 12A, and 13A show the velocity along the axial direction of the venturi structured device. FIGS. 7B, 9B, 10B, 11B, 12B, and 13B show the pressure along the axial direction of the venturi structured device. The pressure is reduced significantly from the inlet pressure to the throat pressure due to the substantial increase in fluid velocity. The pressure along the channel throat is very low, i.e., near the vacuum, which promotes the evaporation of water. The evaporated water flows out of the moving saline water through the vapor outlet. FIG. 8 shows the saturation pressure for different operating temperatures. As shown, at a pressure of 20 kPa, water boils at a temperature of about 60° C.

It is to be understood that the low energy desalination system including a venturi device is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A desalination system comprising:
   a venturi device including:
      a nozzle for receiving saltwater from a source of saltwater, the nozzle having a first diameter at a first end and a second diameter at a second, opposing end, the second diameter being smaller than the first diameter,
      a hollow tube having first and second opposing ends, a vapor outlet defined within a wall of the tube, and a throat defined by an interior region of the tube between the vapor outlet and the first end, the first end of the tube being connected to the second end of the nozzle, the tube having a diameter equal to the second diameter of the nozzle, and
      a diffuser for reducing the velocity of a resulting concentrated brine, the diffuser having a first diameter at a first end and a second diameter at a second end, the second diameter being smaller than the first diameter and equal to the diameter of the tube;
   a vapor pipe connected to the vapor outlet;
   a freshwater tank connected to the vapor pipe; and
   a brine tank connected to the diffuser.

2. The desalination system as recited in claim 1, further comprising a source of vacuum in communication with the freshwater tank for maintaining the interior of the freshwater tank at a lower pressure than the throat of the venturi device.

3. The desalination system as recited in claim 2, wherein the source of vacuum is within the interior of the freshwater tank.

4. The desalination system as recited in claim 2, wherein the source of vacuum is external to the freshwater tank and is connected to the interior of the freshwater tank by a water vapor pipe.

5. The desalination system as recited in claim 1, further comprising:
   a saltwater pump having an inlet and an outlet;
   a supply pipe connecting the inlet of the saltwater pump to the source of saltwater; and
   a saltwater pipe connecting the outlet of the saltwater pump to the nozzle of the venturi device.

6. The desalination system as recited in claim 1, further comprising a brine tank and a brine pipe connecting the diffuser to the brine tank.

7. A desalination system comprising:
   a venturi device including:
      a nozzle for receiving saltwater from a source of saltwater, the nozzle having a first diameter at a first end and a second diameter at a second, opposing end, the second diameter being smaller than the first diameter,
      a tube having first and second opposing ends, a vapor outlet defined within a wall of the tube, and a throat defined by an interior region of the tube between the vapor outlet and the first end, the first end of the tube being connected to the second end of the nozzle, the tube having a diameter equal to the second diameter of the nozzle, and
      a diffuser for reducing the velocity of a resulting concentrated brine, the diffuser having a first diameter at a first end and a second diameter at a second end, the second diameter being smaller than the first diameter and equal to the diameter of the tube;
   a vapor pipe connected to the vapor outlet;
   a freshwater tank connected to the vapor pipe;
   a brine tank connected to the diffuser;
   a saltwater pump having an inlet and an outlet;
   a supply pipe connecting the inlet of the saltwater pump to the source of saltwater,
   a pressurized saltwater pipe connecting the outlet of the saltwater pump to the nozzle of the venturi device; and
   a brine pipe connected to the diffuser and brine tank.

8. The desalination system as recited in claim 7, further comprising a source of vacuum in communication with the freshwater tank for maintaining the interior of the freshwater tank at a lower pressure than the throat of the venturi device.

9. The desalination system as recited in claim 7, wherein the source of vacuum is within the interior of the freshwater tank.

10. The desalination system as recited in claim 7, wherein the source of vacuum is external to the freshwater tank and is connected to the interior of the freshwater tank by a water vapor pipe.

* * * * *